United States Patent [19]
Joyce

[11] Patent Number: 5,632,236
[45] Date of Patent: *May 27, 1997

[54] GAS-FIRED HEATERS WITH BURNERS WHICH OPERATE WITHOUT SECONDARY AIR AND HAVE A SUBSTANTIALLY SEALED COMBUSTION CHAMBER

[75] Inventor: John V. Joyce, Bayview, Australia

[73] Assignee: Bowin Technology Pty. Ltd., Brookvale, Australia

[*] Notice: The term of this patent shall not extend beyond the expiration date of Pat. No. 5,317,992.

[21] Appl. No.: 468,919

[22] Filed: Jun. 6, 1995

Related U.S. Application Data

[63] Continuation-in-part of Ser. No. 255,092, Jun. 7, 1994, Pat. No. 5,435,716, which is a continuation-in-part of Ser. No. 997,899, Dec. 29, 1992, Pat. No. 5,317,992.

[30] Foreign Application Priority Data

Dec. 30, 1991 [AU] Australia .................. PL0213

[51] Int. Cl.⁶ .................. F22B 5/00; F23D 14/66; F23D 14/02
[52] U.S. Cl. .................. 122/14; 122/17
[58] Field of Search .................. 122/13.1, 14, 17, 122/19; 431/326, 328, 329; 126/389, 350 R

[56] References Cited

U.S. PATENT DOCUMENTS

| | | | |
|---|---|---|---|
| 2,345,677 | 4/1944 | Koppel | 122/17 |
| 2,621,720 | 12/1952 | Dufault | 158/99 |
| 2,782,780 | 2/1957 | Bourner | 126/89 |
| 3,185,204 | 5/1965 | Loeb et al. | 431/329 |
| 3,245,458 | 4/1966 | Patrick et al. | 431/329 |
| 3,336,914 | 8/1967 | Ruhl | 126/90 |
| 3,353,528 | 11/1967 | Robinson | 126/91 |
| 3,681,002 | 8/1972 | Weller et al. | 431/268 |
| 3,726,633 | 4/1973 | Vasilakis et al. | 431/329 |
| 3,733,170 | 5/1973 | Kobayashi et al. | 431/329 |
| 4,314,542 | 2/1982 | Bratko | 431/328 |
| 4,491,092 | 1/1985 | Charron et al. | 122/18 |
| 4,492,185 | 1/1985 | Kendall et al. | 122/32 |
| 4,510,890 | 4/1985 | Cowan | 122/17 |
| 4,548,163 | 10/1985 | Siedhoff | 122/13 R |
| 4,608,012 | 8/1986 | Cooper | 431/328 |
| 4,641,631 | 2/1987 | Jatana | 126/101 |
| 4,672,919 | 6/1987 | Staats | 122/13 R |
| 4,737,102 | 4/1988 | Jinno et al. | 431/328 |
| 4,782,815 | 11/1988 | Friedman et al. | 126/361 |
| 4,790,268 | 12/1988 | Eising | 122/17 |
| 4,793,800 | 12/1988 | Vallett et al. | 431/328 |
| 4,867,106 | 9/1989 | Staats | 122/13 R |
| 4,925,093 | 5/1990 | Moore, Jr. et al. | 237/19 |
| 4,940,042 | 7/1990 | Moore, Jr. et al. | 126/344 |
| 4,953,511 | 9/1990 | Bosh et al. | 122/18 |
| 4,993,402 | 2/1991 | Ripka | 126/361 |
| 5,022,352 | 6/1991 | Osborne et al. | 122/17 |
| 5,044,353 | 9/1991 | Mizuno et al. | 126/91 A |
| 5,115,798 | 5/1992 | Moore, Jr. et al. | 431/242 |
| 5,139,415 | 8/1992 | Schwank | 431/242 |
| 5,355,841 | 10/1994 | Moore et al. | 431/328 |

*Primary Examiner*—Marguerite McMahon
*Attorney, Agent, or Firm*—Pearne, Gordon, McCoy & Granger

[57] ABSTRACT

A gas-fired burner apparatus includes a porous combustion surface disposed in a combustion chamber substantially sealed to prevent entry of secondary air. A subatmospheric pressure is maintained in the combustion chamber by a natural or aspirated draft. The subatmospheric pressure cooperates with an aspirating flow of fuel to the burner apparatus to provide an increased flow of primary combustion air which reduces the combustion temperature and the emission of pollutants. Alternatively, the subatmospheric pressure may be used to achieve a given flow of primary combustion air with a reduced combustion surface area. Water heater and room heater applications of the burner apparatus are illustrated.

7 Claims, 3 Drawing Sheets

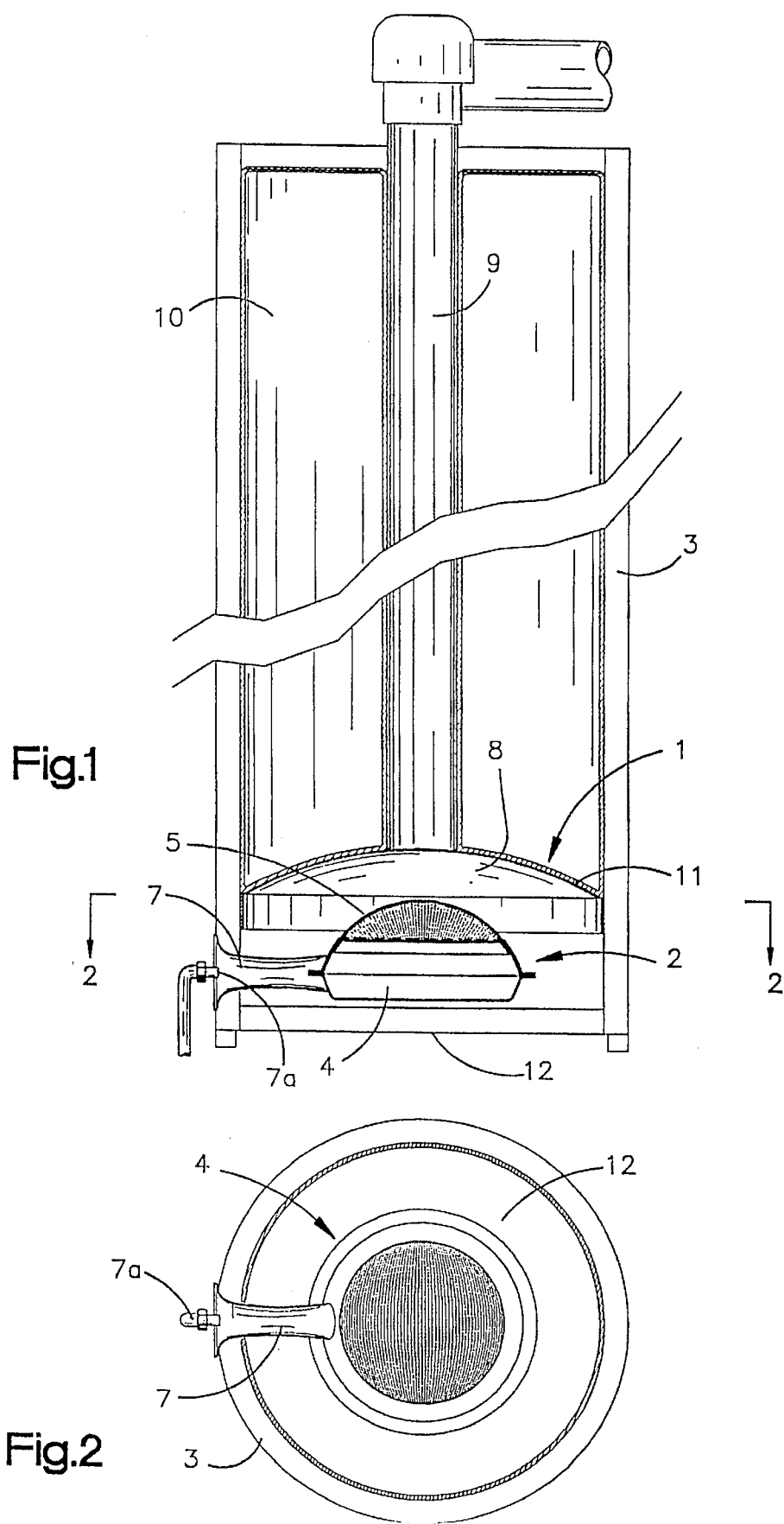

5,632,236

GAS-FIRED HEATERS WITH BURNERS WHICH OPERATE WITHOUT SECONDARY AIR AND HAVE A SUBSTANTIALLY SEALED COMBUSTION CHAMBER

This application is a continuation-in-part of application Ser. No. 08/255,092, filed Jun. 7, 1994, now U.S. Pat. No. 5,435,716 which is a continuation-in-part of application Ser. No. 997,899 filed Dec. 29, 1992, now U.S. Pat. No. 5,317, 992, dated Jun. 7, 1994.

BACKGROUND OF THE INVENTION

The present invention relates to heaters, and more particularly, to gas-fired heaters, in which the combustion occurs at or near a combustion surface maintained at subatmospheric pressure. The burner is operated at conditions which result in primarily convective heat transfer and reduced emissions of oxides of nitrogen ($NO_x$) and carbon monoxide (CO).

Two embodiments of this invention are illustrated. One embodiment provides a novel and improved water heater in which improved performance is obtained by providing the combustion surface in a sealed combustion chamber maintained at subatmospheric pressure without the use of powered mechanical fans or blowers. A second embodiment provides a novel and improved space heater in which the combustion surface of the burner is maintained at subatmospheric pressure and is arranged for direct heat transfer to the surrounding space to be temperature conditioned.

RELATED ART

The exact amount of air needed to provide complete combustion of a given amount of fuel is the stoichiometric amount of air, and the stoichiometric ratio is said to be 1. The ratio of air to fuel must equal or exceed the stoichiometric ratio if combustion is to be complete. If the primary air flow is at least the stoichiometric amount, then theoretically no additional or secondary air is required for complete combustion. Secondary air generally complicates the combustion process, leading to nonuniform combustion areas, hotter or cooler than the average. Such non-uniformity of combustion leads to localized production of undesirable combustion products, particularly carbon monoxide (CO) and the oxides of nitrogen ($NO_x$).

In order to reduce the production of $NO_x$, various types of water heaters have been provided with infrared burners supplied with sufficient primary air to establish complete combustion. Typically, such units employ a powered fan or blower to establish the fuel/air mixture supplied to the infrared burner, or fans or blowers located at the exhaust of the unit to induce flow of the combustion products. U.S. Pat. Nos. 4,492,185 and 4,993,402 illustrate water heater units having infrared burners combined with powered mechanical fans or blowers.

It is also known to provide a water heater utilizing an infrared burner in which combustion is achieved without the use of secondary air and in which powered blowers or fans are not used to induce the flow of the fuel/air mixture or the combustion products. The U.S. Pat. No. 4,510,890 discloses such a unit. In that patent, a water heater is described having a vertically extending, side-mounted infrared burner. A flue stack is connected to the combustion chamber at a location spaced from the upper and lower ends of the combustion chamber. Such flue stack is angulated to the axial center of the tank, and thereafter, extends vertically to its discharge end.

An additional problem associated with both gas-burner water heaters and space heaters is that the burners are large and cumbersome, and only with difficulty can the burners be accommodated in restricted spaces. Further, where it is necessary to achieve a high burner loading in a relatively small space, maintaining low $NO_x$ emissions becomes even more difficult as increased loading tends to increase the combustion temperature.

Gas-fired space heaters utilizing primarily convective heat transfer must circulate the heated air at a sufficiently low temperature to avoid injury or damage while also maintaining the comfort of room occupants. In the case of direct heat transfer, the circulated heated air has heretofore been diluted with cooler room air passed through the heater as secondary air. As noted above, the use of secondary air generally complicates the combustion process and results in the emission of higher levels of pollutants.

It is the object of the present invention to overcome the disadvantages of the existing technology.

SUMMARY OF THE INVENTION

As indicated, the present invention contemplates a gas-fired burner having a combustion surface which is maintained at subatmospheric pressure during burner operation. This is provided by a natural draft resulting from the buoyancy of the hot products of combustion or an aspirated draft produced by a flow of circulating air. This provides increased gas flow velocities through the combustion surface of the burner and enables the relative size of the combustion surface area to be reduced for a given burner heat input or rating.

The burner is operated at conditions which result in primarily convective heat transfer, e.g. 70% to 80% or more, and reduced emissions of pollutants. To that end, the combustion or flame temperature is maintained in the range of 600° to 900° C. by the use of excess primary combustion air. Generally, the excess air is in the range of from about 110% to about 200% in order to maintain the desired combustion temperatures. The combustion loading of the burner surface may range from about 500 to about 2,000 MJoules/m² hr. These operating conditions are discussed in applicant's copending U.S. patent application Ser. No. 891,155, filed May 28, 1992. These operating conditions reduce the $NO_2$ emissions to less than about 5 ng/Joule and provide a $CO/CO_2$ ratio of less than about 0.003. Accordingly, the outdoor ventilation of the flue products is not required. Such combustion temperatures also favor convective heating over radiant heating so that the burners provide primarily convective heat transfer. Heretofore, burners having combustion surfaces were operated at significantly higher temperatures to promote radiant heat transfer.

As indicated, natural or aspirated drafts are used to provide subatmospheric pressure conditions in the combustion chamber to enhance the flow of gases through the combustion surface. Such drafts are derived from other necessary heater or burner functions such as outdoor ventilating of products of combustion to the atmosphere or circulating heated air to temperature condition a space. Thus, the drafts do not require additional apparatus or process steps provided solely to achieve the benefits of subatmospheric pressure operation.

The first embodiment of this invention provides a novel and improved water heater in which a substantially sealed combustion chamber is combined with a gas-fired burner having a combustion surface arranged so that all of the combustion occurs with primary air, and secondary air is not used. Fuel and primary air enter a fuel chamber immediately below the combustion burner surface by way of an air duct. In the illustrated embodiment gaseous fuel assists in inducing the flow of sufficient primary air through the air duct and into the fuel chamber to at least meet the requirements for complete combustion without secondary air.

The upper wall of the combustion chamber is in direct heat exchange relationship with the water within the water heater and has a concave, domed-shape which is inwardly curved to accommodate the upward flow of the combustion products from the combustion chamber into a vertically extending flue stack. The chamber and flue stack are structured so that the natural draft results in the flow of the combustion products up through the flue stack and produces a subatmospheric pressure (e.g. 0.015 inches water column) within the combustion chamber. This facilitates the flow of fuel and primary air through the burner and the combustion surface so that a given size burner operates at a higher loading than the same burner would operate if the combustion chamber were maintained at atmospheric pressure. This permits the manufacture of a water heater of a given rating with a smaller size burner than would be possible if the combustion chamber were at atmospheric pressure. The burner therefore is readily installed in the customary burner space typically used in residential water heaters with minimal modifications. Accordingly, the cost savings resulting from the burner size reduction are further increased by the cost reductions associated with reduced tooling and fabrication changes.

Since this embodiment of the invention does not require separate fans or blowers to induce flow, it is possible to produce and operate a water heater having a low $NO_x$ production rate without electrical power connections.

In a second embodiment of this invention, a room or space heater is disclosed in which environmental or ambient air is drawn into a passage system with a powered blower. The passage system is wrapped around a combustion chamber having the burner therein. The combustion chamber and environmental air passage are shaped and structured so that the combustion products from the combustion chamber are entrained and mixed with the environmental air at the discharge from the heater. The entrainment and mixing process, produces an aspirated draft and a subatmospheric pressure in the combustion chamber so that a given size burner is capable of operating at higher combustion loading levels than would be possible if the combustion chamber were maintained at atmospheric pressure. In this embodiment, a powered fan is required to circulate the heated air from the space heater into the environment. As indicated, this fan also provides an aspirated draft and a subatmospheric pressure within the combustion chamber and causes a mixing of the combustion products and the circulated air so that the exhaust temperature from the heater is within safe limits.

BRIEF DESCRIPTION OF THE DRAWINGS

FIG. 1 is a schematic longitudinal sectional view of a water heater having a burner according to the invention;

FIG. 2 is a schematic plan view of the water heater and burner shown in FIG. 1, taken along line 2—2 of FIG. 1;

DETAILED DESCRIPTION OF THE PREFERRED EMBODIMENT

Referring to FIG. 1, heater 1 includes a gas-fired burner or combustion unit 2 having a combustion surface 5 housed within the base of a water heater 3. The combustion surface 5 is generally horizontally mounted and centered within the base of the water heater.

Figure 3:
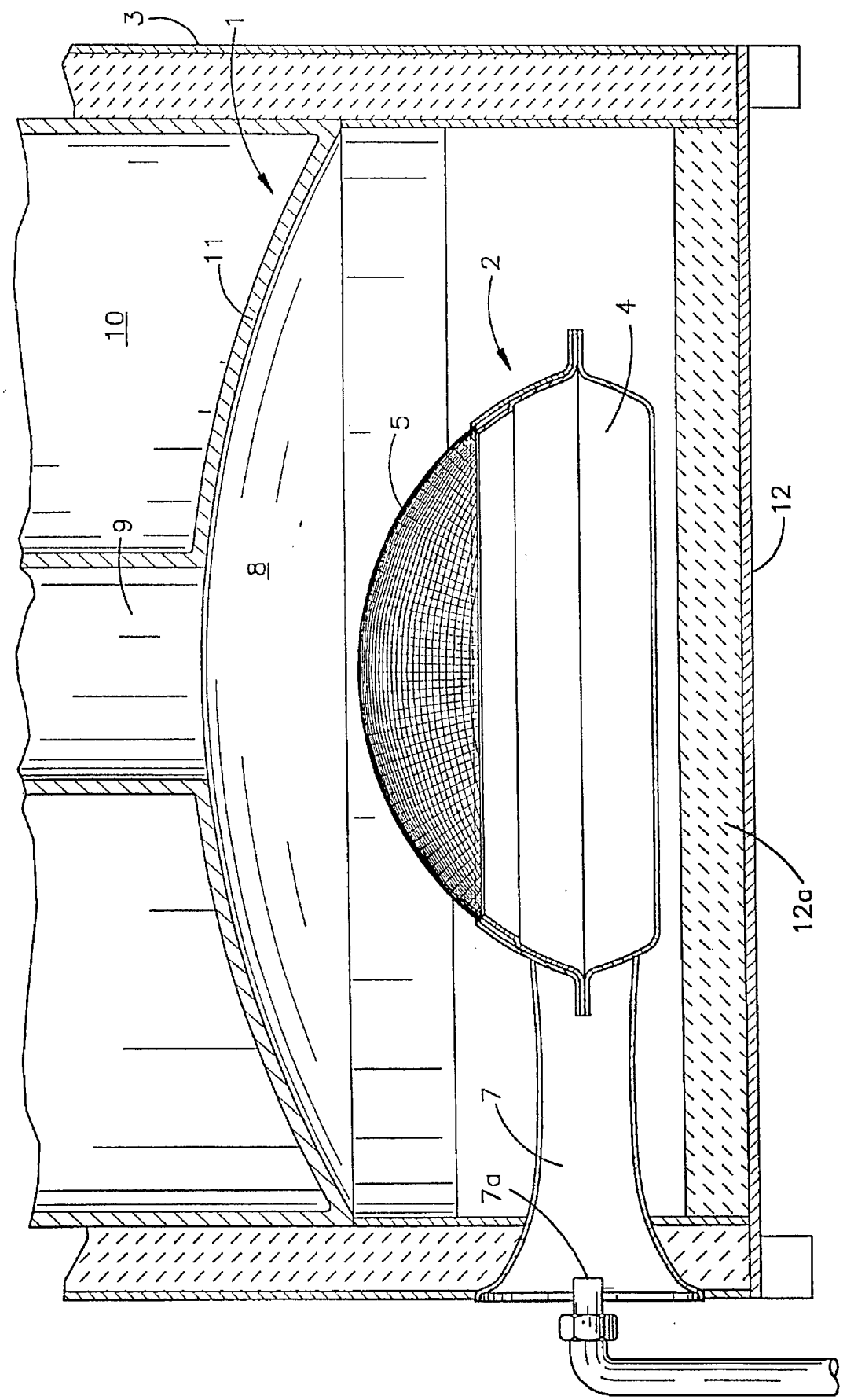
FIG. 3 is an enlarged fragmentary side elevation of the burner and combustion chamber portion of the unit.
Figure 5:
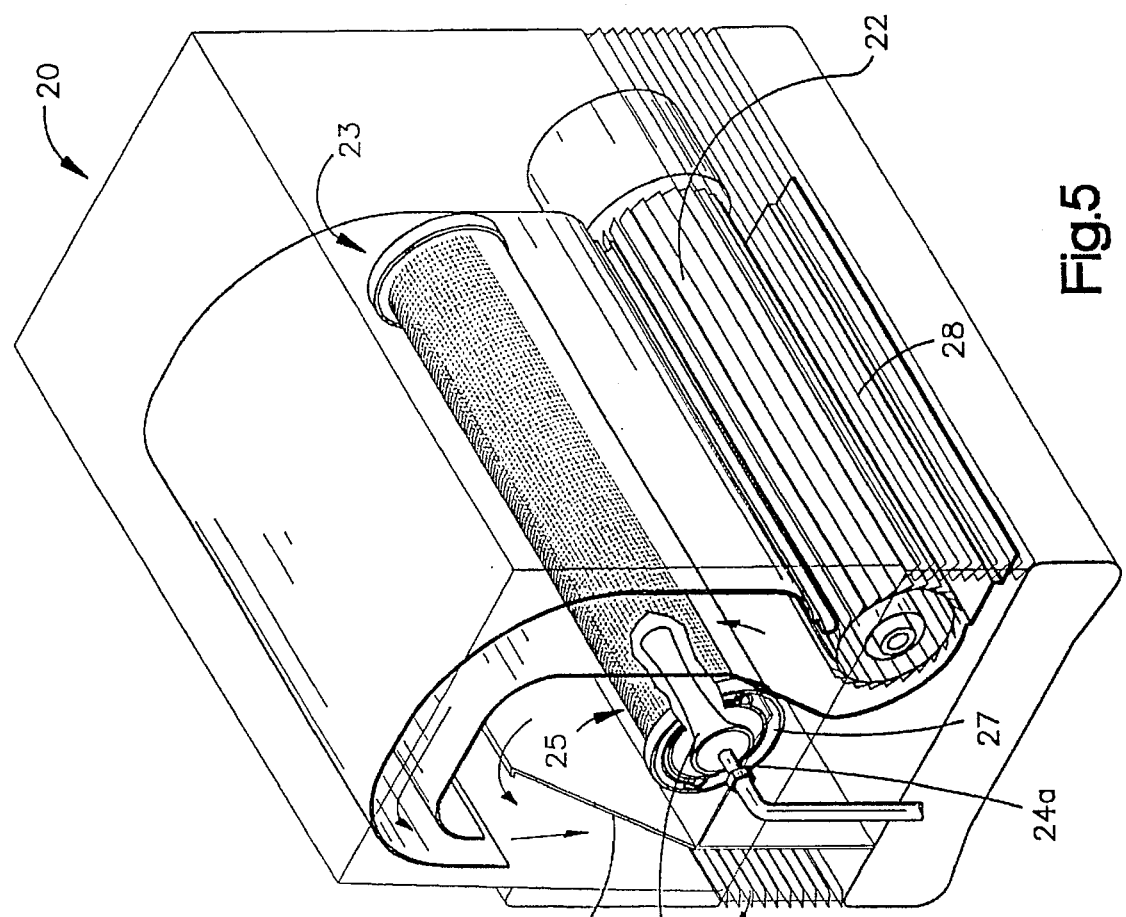
FIG. 5 is a perspective view of the space heater shown in FIG. 4 with parts omitted for clarity of illustration.

As shown in FIG. 3, the combustion unit 2 includes a plenum chamber 4 positioned below the burner combustion surface 5 and an air/fuel mixing and delivery device comprising an air duct 7. The air duct may be in the form of a venturi as shown or in the form of a cylindrical tube or pipe. The cross-sectional area of the air duct should be sufficiently large to minimize pressure flow losses relative to the subatmospheric pressure driving force above the combustion surface 5. Gaseous fuel, such as natural gas, enters the air duct 7 from a nozzle 7a and aspirates or induces environmental air to enter the plenum chamber 4 with the fuel. In this manner, the air duct 7 operates in response to the flow of fuel to aspirate and combine environmental air with the fuel to form a combustible air/fuel mixture which is delivered to the plenum chamber 4 at a plenum pressure.

Nozzle 7a is preferably positioned approximately one inch away from the plane of the mouth of the air duct 7. It has been determined that improved results are achieved if the entrance of the air duct is open to the exterior of the heater shell. Further, the air duct allows excessive primary air to mix with the fuel in the plenum 4. The majority of the primary combustion air is provided by the driving force of the subatmospheric pressure maintained above the combustion surface 5.

Combustion chamber 8 is in fluid communication, via pores in the burner combustion surface 5, with the plenum chamber 4, which in turn is in fluid communication with the air duct 7. Air duct 7 provides at least partial mixing of the air and fuel, which is completed within the plenum chamber 4. The burner combustion surface 5 is preferably made of wire, and is more preferably made of inconel 601 wire. Surface 5 may also be made of other heat resistant porous materials, such as ceramics.

The burner combustion surface 5 is disposed within a substantially sealed combustion chamber 8. Combustion chamber 8 may enclose the burner element 2, or the burner element 2 may be attached to the bottom wall 12 of the combustion chamber, whereby burner combustion surface 5 constitutes a portion of the inner wall of chamber 8. Chamber 8 is sufficiently sealed to prevent entry into the combustion chamber of secondary air in quantities which could adversely affect burner operation. Flue stack 9 constitutes an opening to the environmental air. Thus, as used here in relation to combustion chambers, "sealed" or "closed" refers to preventing entry of secondary air into the combustion chamber.

As best shown in FIG. 3, flue stack 9 extends vertically upward from an upper dome-shaped wall surface 11 of the combustion chamber 8 through the center of the water tank 10. The flue stack may extend above the water heater to increase the natural draft and further decrease the subatmospheric pressure in the combustion chamber 8. The dome-shaped upper wall 11 functions to guide the combustion products into the flue stack 9. Further, the domed wall 11 operates as a heat exchange surface since it is part of the water tank.

Flue stack 9 may also contain baffle means (not shown) to improve efficiency of heat transfer from combustion gases to the water. The baffle should be designed to frictional flow losses in the flue stack.

In a typical water heater in which the lower portion of the combustion chamber is open to environmental air and the burner has been extinguished between heating cycles, cool air is drawn through the combustion chamber and flue stack by the buoyancy of air heated by the hot water contained in the water heater 3. Such air cools the heated water, resulting in passive losses and reduced efficiency.

By sealing the combustion chamber, entry of such unheated air is substantially prevented. The only exception is a small amount of air passing through the air duct 7. Thus, providing a sealed combustion chamber further reduces passive heat losses by restricting the influx of cool air during interim, shutdown periods.

Positioned on the lower wall 12 of the combustion chamber 8 is insulation 12a which performs two functions. First, it reduces noise during burner operation, and second, it reduces heat loss through wall 12.

Air duct 7 is adapted to deliver and at least partially mix air and fuel having an air component at least equal to 110% of the stoichiometric amount. In this embodiment of the present invention, the preferred amount of air mixed with fuel in the air duct exceeds the stoichiometric amount by approximately 20 to 100% in order to lower the combustion temperature and the $NO_x$ emissions to the desired level.

Excess air is used in the present invention to maintain the combustion temperature in the range from 600°–900° C., and to assure complete combustion of fuel, thereby to maintain a low level of undesirable emissions from the combustion. The excess air is primary air, since it is mixed with the fuel entering the combustion element via the air duct. Excess air mixed with fuel as primary combustion air acts to reduce the level of undesirable emissions below that obtained when secondary air is allowed to enter. At the lower range of excess air (e.g. 10%), the quantity of CO is reduced by providing complete combustion of carbon to $CO_2$. At the higher range of excess air (e.g. 100%), the combustion temperature is lowered to the point that CO production begins to increase. The excess air inhibits formation of $NO_x$ by maintaining a low combustion temperature. Secondary air, on the other hand, causes a nonuniform combustion process, and results in increased emissions due to resulting hot and cool zones on the combustion surface. Generally, hot zones create excess $NO_x$; cool zones create excess CO.

The subatmospheric pressure in the sealed combustion chamber is obtained by the natural draft of the venting of the products of combustion through the flue stack to the atmosphere. The pressure in the combustion chamber in the region above the combustion surface can be described mathematically as:

$P_{ch} = P_{atm} - [(D_{atm} - D_{fl}) \times H \times g] + \text{friction loss}$ where:
$P_{ch}$ = pressure within combustion chamber
$P_{atm}$ = atmospheric pressure
$D_{atm}$ = density of surrounding atmosphere
$D_{fl}$ = flue gas average density
g = gravitational constant
$H_{fl}$ = flue stack height Friction loss is generated by the turbulent flow of the hot combustion products buoyantly rising in the flue stack or frictional interactions with the flue stack walls and baffles. Flue stack height is the vertical height of the flue stack from the upper surface of the combustion chamber to the point of discharge to the environment.

The first embodiment described herein is designed for a residential water heater. Typical water heaters require a baffle in the flue stack to reduce thermal losses and increase efficiency to mandated levels. Frictional losses due to the baffle clearly act to decrease the natural draft effect. Engineering trade-offs between baffle design and burner design must be considered in the application of this invention to water heaters and other uses.

Preferably the chamber and flue stack are sized to reduce the pressure in the combustion chamber to the lowest possible value obtainable from the natural buoyancy of hot combustion products ventilating through the flue stack, consistent with efficient heat transfer to the medium to be heated.

The natural draft as described above acts to pull more air through the burner surface than would pass without the particular configuration employed in this invention. The increased air flow increases the percentage of excess air and lowers the combustion temperature and $NO_x$ emissions. An atmospheric pressure driven burner operating without the benefit of such natural draft could not achieve the benefits obtainable from the instant invention. The present result is obtained by increasing the pressure drop across the burner combustion surface.

Instead of using natural draft to increase air flow, the air flow can be held at a desired stoichiometric ratio, and the combustion surface area can be reduced. A smaller combustion surface area, having fewer pores or openings, restricts the flow of air/fuel mixture more than a larger area with more openings. In a smaller element there will be a greater resistance to flow of the same volume of air/fuel mixture. Thus with the present invention the same amount of air and fuel is passed through the smaller area with natural draft being used to overcome the greater resistance to flow. The burner 2 has been demonstrated at a heat input resulting in a combustion loading of 1644 MJ/hr m². An equivalent rated burner operating without a sealed combustion chamber in the same water heater producing substantially the same $NO_x$ emissions had a combustion loading of about 500 MJ/hr m². In this manner the natural draft effect enables reduction of the combustion surface area by a factor of more than 3 and results in a significantly lower cost for manufacture of the burner.

Figure 4:
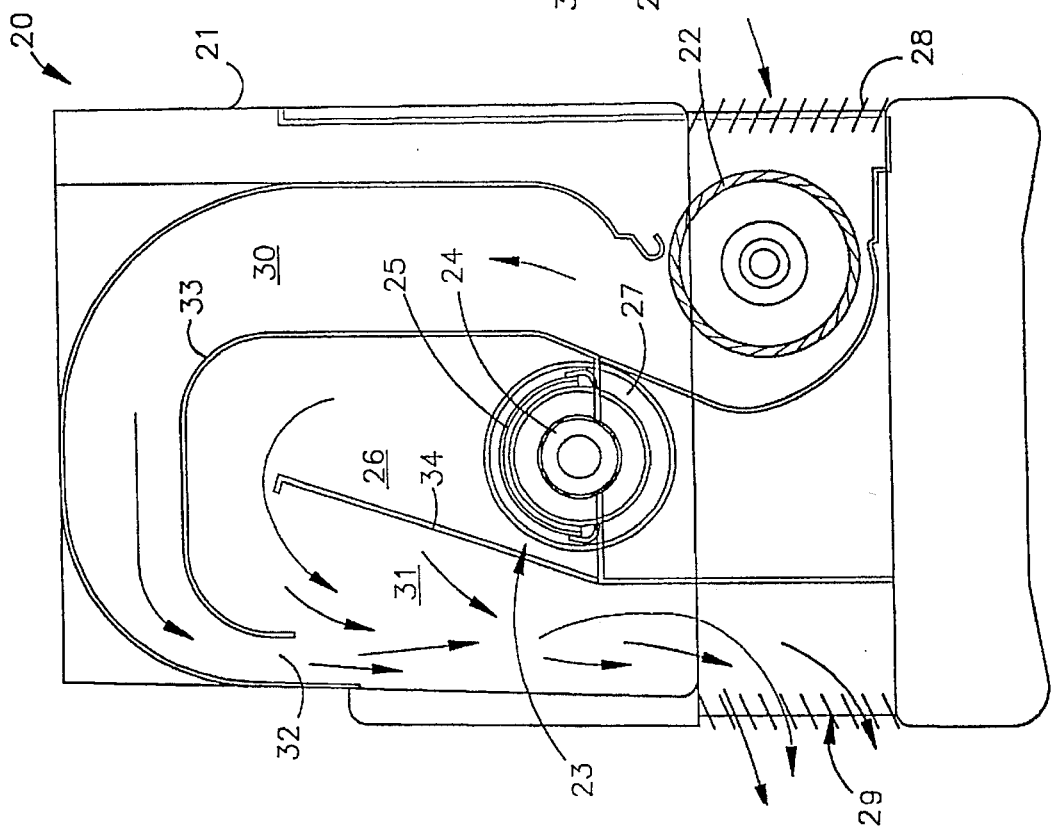
FIG. 4 is a schematic vertical section of a space heater according to the invention.

The second embodiment of the present invention provides a room or space heater suitable for unvented, indoor use. Referring to FIG. 4, a room heater 20 includes a housing 21. A combustion unit or burner element 23 is mounted in the housing 21 at a position approximately centered from front to back and vertically slightly below the center of the housing 21. Element 23 has an elongate cylindrical shape and extends horizontally through the housing 21. One end of element 23 is closed, while at the opposite end is air duct 24, which provides a combustible air/fuel mixture to element 23. A gaseous fuel is introduced into the air duct 24 through gas supply nozzle 24a.

The air duct 24 is centrally mounted within the burner element 23 with the plane of the flared circular end of the duct aligned with the end of the burner element. Nozzle 24a is preferably positioned approximately one inch away from the plane defined by the flared circular end of the air duct.

The upper combustion surface 25 of burner element 23 is porous, to allow passage of the air/fuel mixture from the air duct 24 through the surface for combustion. Surface 25 is preferably made of wire, and is more preferably made of inconel 601 wire. Surface 25 may also be made of other heat resistant porous materials, such as ceramics.

The volume inside the cylindrical combustion unit 23 defines a plenum chamber 27. Chamber 27 is in fluid communication with combustion chamber 26 via the pores of surface 25. Chamber 27 is likewise in fluid communication with environmental air and gas supply nozzle 24a via air duct 24.

The space above the burner surface 25 is enclosed by the wall 33 of the blower channel 30 (as described more fully below) a front wall 34 and axial end walls (not shown), which cooperate to substantially define the combustion chamber 26. The terminal portions of the rear wall 33 and the front wall 34 cooperate to define an elongate combustion chamber discharge opening 31 through which the products of combustion are removed.

Disposed on one side of heater 20 is an intake vent 28 through which environmental air is drawn. An electric blower 22 is mounted in the housing 21 near the intake vent 28. Blower 22 draws environmental air into the housing 21 and propels the air through channel or passage 30 towards exit vent 29 via an elongated nozzle or orifice 32. The environmental air handled by blower 22 does not participate in combustion of fuel in heater 20. Such air is used for entraining, diluting and then distributing the heat provided by combustion element 23 by aspirating or inducing the flow of combustion gases out of the combustion chamber 26. Blower 22 preferably provides approximately 40 times the amount of air used by the combustion element 23 in combustion of fuel, but this amount may be widely varied depending on the individual needs of the heater user. As the environmental air from blower 22 passes through passage or channel 30, it is forced through discharge nozzle or orifice 32, which produces a downwardly directed jet of air of increased velocity. This high velocity jet of air moving past the discharge opening 31 of the combustion chamber 26 entrains combustion products by aspiration and produces a subatmospheric pressure in chamber 26.

Several benefits accrue from the provision of this volume of air according to the invention. First, the extremely hot combustion gases exiting the combustion chamber 26 are diluted and thereby cooled to about 90° C. by the flow of air from blower 22. Such dilution allows more uniform distribution of heat throughout the space to be heated. Dilution also provides a safety feature by lowering the temperature from a dangerously high level to a sufficiently cool level at which ignition of adjacent materials cannot occur.

Second, the induced flow of exhaust gases out of combustion chamber 26 reduces the pressure within chamber 26, thereby allowing an increased flow of primary air into element 23 via air duct 24. The increased air flow enables the space heater of the present embodiment to maintain a uniform combustion temperature in the range of 600°–900° C. with a smaller combustion surface area and burner. Such temperature control enables reduction of emissions as described above in connection with the first embodiment.

A third benefit of this embodiment of the invention is that environmental air propelled by blower 22 through passage 30 between wall 33 and housing 21 serves to prevent the housing from becoming excessively hot during operation of the heater and preheats the air. This reduction of the housing temperature enables the safe use of lower cost housing materials that are aesthetically more pleasing.

It is important to note that the environmental air circulated through passage 30 by blower 22 does not participate in combustion of the fuel. Further, blower 22 contacts no gases produced by the combustion. Thus, in this embodiment of the present invention, blower 22 is required to act on neither air supplied to nor products from combustion. The sole purpose of blower 22 is to supply a volume of environmental air at a velocity sufficient to entrain gases produced in the combustion chamber and to propel the heated air and combustion products into the space being heated. The environmental air is thereby mixed with those gases, diluting the heat of combustion to a safely useable level.

The subatmospheric pressure achieved in this embodiment resulted in an increase in the combustion loading to 644 MJoules/m$^2$ hr compared to a combustion loading of 540 MJoules/m$^2$ hr in an equivalent conventional low NO$_x$ room heater. This is an increase of about 20% in the combustion loading which corresponds with a 20% decrease in the combustion surface area for a given heat input rating.

The burner of this embodiment provides primarily convective heat transfer. This burner, when mounted in an overhead heater, was measured to provide radiant heat transfer in the range of 19 to 25% of the total heat released by combustion.

According to both illustrated embodiments of the present invention, natural or aspirated drafts may be used to maintain a subatmospheric pressure in a combustion chamber which enables the size of the combustion surface area and burner to be reduced for a given heat energy input or burner rating. Also, the emissions of CO and NO$_x$ can be substantially reduced in such draft assisted burners by using preferred combinations of burner operating conditions.

A further advantage of the use of the presently disclosed burners in combination with the natural or aspirated draft effects is the reduction is size of the air/fuel mixing device, which is preferably embodied by an air duct, but which may also be a venturi. For example, in a standard water heater a burner having comparable combustion element rating or combustion loading, but without the benefit of natural or aspirated drafts, would require a venturi approximately 10 inches in length to provide sufficient mixing of fuel and air to sustain smooth, even combustion. In the present invention, the air duct preferably used has a length of only about 4.5 inches, a reduction of over fifty percent in length of the air/fuel delivery device from the non-draft burner having a comparable burner rating. Such a reduction is possible because the draft acts to increase flow of air and fuel through the combustion surface for smooth, even combustion thereof.

Finally, there is opportunity for further savings in operating costs due to potential increases in the heating efficiency of these heaters and other similar devices.

The following example is provided as illustration, and is not intended to limit the scope of the present invention in any manner.

EXAMPLE

The following example demonstrates the results obtainable with the present invention in the first embodiment of the invention, a water heater application. In this example, the combustion surface is made of inconel 601 wire screen, and has a diameter of 6.6 inches and thickness of 0.014 inches. The air/fuel mixture contained approximately 20% excess air, above the stoichiometric amount. The combustion element was installed in a 40 gallon residential water heater. Three modifications were made to the water heater: (1) the combustion zone, bound by the bottom pan, inner skirt and inner door, was sealed to reduce secondary air, (2) a mat of insulation was placed on the floor shield to eliminate resonance noise and reduce heat loss, and (3) the flue stack baffle was replaced with a baffle designed to provide efficient heat transfer without excessive air flow reduction. In the following chart, tests 1 and 2 display results obtained with two levels of natural gas input. Test 3 is a duplicate of test 2, used to compare consistency of results.

TABLE

| Test No. | BTU/hr Input | ppm CO | ppm $NO_x$ | ppm NO | ppm $NO_2$ | % Rec. Eff. |
| --- | --- | --- | --- | --- | --- | --- |
| 1 | 34,770 | 45 | 9.0 | 7.1 | 1.85 | 68 |
| 2 | 31,500 | 54 | 9.0 | 6.64 | 2.36 | 73 |
| 3 | 31,500 | 54 | 9.0 | 6.64 | 2.36 | 73 |

Although preferred embodiments of this invention have been shown and described, it should be understood that various modifications and rearrangements of the parts may be resorted to without departing from the scope of the invention as disclosed and claimed herein.

What is claimed is:

1. A room heater comprising a burner having a combustion surface, a combustion chamber above said combustion surface, a source of gaseous fuel, air duct means delivering said fuel to said burner and operating in response to flow of said fuel to produce in said burner an air/fuel mixture containing an amount of air in excess of the amount required to cause complete combustion of said fuel, a bypass air passage separated from said combustion chamber by a wall, a powered blower producing substantial bypass air flow from an environmental air inlet through said bypass passage to a bypass discharge nozzle and operating to provide a jet of air directed to a heater discharge, said wall providing a heat exchange surface between said combustion chamber and said bypass air passage causing preliminary heating of said bypass air before it reaches said nozzle, said combustion chamber providing an exhaust open to said jet of bypass air, said jet of bypass air entraining sufficient combustion gases to produce a subatmospheric pressure in said combustion chamber and also mixing sufficient bypass air with the combustion gases to cause a safe temperature of the resulting mixture flowing through said heater discharge, said subatmospheric pressure in said combustion chamber resulting in an increase in the pressure drop across said combustion surface causing said air/fuel mixture passing through said burner to be greater than would be provided if said combustion chamber were at or above atmospheric pressure.

2. The room heater of claim 1 wherein the area of the combustion surface is reduced for a given heat energy input and burner rating as compared with the area of the combustion surface required for the same heat energy input and burner rating if the combustion chamber was at atmospheric pressure.

3. The room heater of claim 2 wherein the reduction in area of the combustion surface is by 20%.

4. A room heater as set forth in claim 1, wherein said heater discharge is at a level lower than said burner, and said jet of bypass air is directed downwardly past said combustion chamber exhaust.

5. A room heater as set forth in claim 4, wherein said wall extends around said combustion chamber to said combustion chamber exhaust.

6. A room heater as set forth in claim 4, wherein said combustion chamber is substantially sealed to prevent the entrance of secondary air.

7. A room heater as set forth in claim 1, wherein said safe temperature is less than about 90° C.

* * * * *